US010990203B2

(12) United States Patent
Chen et al.

(10) Patent No.: US 10,990,203 B2
(45) Date of Patent: Apr. 27, 2021

(54) TOUCHPAD ASSEMBLY FOR ELECTRONIC DEVICES

(71) Applicant: HEWLETT-PACKARD DEVELOPMENT COMPANY, L.P., Spring, TX (US)

(72) Inventors: Hung-Ming Chen, Taipei (TW); Chao-Wen Cheng, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/641,563

(22) PCT Filed: Aug. 31, 2017

(86) PCT No.: PCT/US2017/049511
§ 371 (c)(1),
(2) Date: Feb. 24, 2020

(87) PCT Pub. No.: WO2019/045710
PCT Pub. Date: Mar. 7, 2019

(65) Prior Publication Data
US 2020/0183510 A1 Jun. 11, 2020

(51) Int. Cl.
G06F 3/0354 (2013.01)
G06F 1/16 (2006.01)

(52) U.S. Cl.
CPC .......... G06F 3/03547 (2013.01); G06F 1/169 (2013.01); G06F 1/1616 (2013.01)

(58) Field of Classification Search
CPC .................................................... G06F 1/1616
See application file for complete search history.

(56) References Cited

U.S. PATENT DOCUMENTS

| 2010/0182263 | A1 | 7/2010 | Aunio et al. |
| 2011/0141052 | A1 | 6/2011 | Bernstein et al. |
| 2013/0009898 | A1 | 1/2013 | Mathew et al. |
| 2016/0274678 | A1* | 9/2016 | Senatori ................. G06F 3/039 |

FOREIGN PATENT DOCUMENTS

| CN | 103309508 | 9/2013 |
| CN | 203309464 | 11/2013 |
| CN | 103500006 | 1/2014 |
| CN | 204759288 | 11/2015 |

OTHER PUBLICATIONS

MacKenzie I.S., the Tactile Touchpad, Mar. 22-27, 1997,< http://dl.acm.org/citation.cfm?id=1120408&CFID=952599200&CFTOKEN=59212668 >.

* cited by examiner

Primary Examiner — Jerry Wu
(74) Attorney, Agent, or Firm — Global IP Services PLLC

(57) ABSTRACT

In one example, touchpad assembly is disclosed, which may include a bottom cover, a horizontal elastic member flexibly positioned on the bottom cover, a balancing bar disposed on the bottom cover and substantially parallel to the horizontal elastic member, and a metal dome. The metal dome may include a first end fixedly connected to the bottom cover via a first fixture, and a second end to hold the horizontal elastic member and the balancing bar such that the balancing bar is flexibly engaged with the bottom cover. The balancing bar, the metal dome, and the horizontal elastic member may control a flexure of a touchpad when the touchpad is pressed.

15 Claims, 4 Drawing Sheets

TOUCHPAD ASSEMBLY FOR ELECTRONIC DEVICES

BACKGROUND

A touchpad may be a human input interface having a tactile sensing surface. The sensing surface may translate a motion or a position of user's finger(s) into spatial data, for instance, to control a pointer or cursor displayed on a computer screen. The sensing surface and associated device drivers may provide further interface options. For example, some touchpads and associated drivers may interpret tapping the touchpad as a click action. Some touchpads allow a user to use multiple fingers to interface with the computer screen. For example, such a multi-touch touchpad may allow the user to tap the touchpad with two fingers to provide a right click action.

BRIEF DESCRIPTION OF THE DRAWINGS

Examples are described in the following detailed description and in reference to the drawings, in which.

DETAILED DESCRIPTION

Electronic devices such as portable computers, may have touchpads for receiving user inputs. The touchpads may include a tactile surface that may translate a motion or a position of user's finger(s) into spatial data, for instance, to control a pointer or cursor displayed on a computer screen. Further, the touchpads may have a switch that allows a user to depress the tactile surface to provide a click input. In some cases, whether the click input is registered as a left or right click input may depend on where the user presses the tactile surface. For example, if the user presses on the left half of the tactile surface, the switch actuation may be registered as the left click input, and if the user presses on the right half, the switch actuation may be registered as the right click input.

The touchpad may have a degree of flexibility. When the touchpad is sufficiently wide and when the user presses certain locations, such as the left or right front corners, the touchpad may contact a housing (i.e., bottom cover) before actuating the switch. For example, this may occur if the touchpad is made wider to accommodate multi-finger gestures. Accordingly, in some cases, the user may not be able to perform a click action by pressing on the corners of the touchpad if the touchpad contacts the housing before actuating the switch. Further, even if the user is able to actuate the switch by pressing the front corners, excessive touchpad flexure may create an unsatisfactory user experience.

Examples described herein may provide a touchpad assembly with a balancing mechanism to control flexure of a touchpad. The touchpad assembly may include a bottom cover, a touchpad disposed on the bottom cover, a horizontal elastic member flexibly positioned on the bottom cover, a balancing bar disposed on the bottom cover and substantially parallel to the horizontal elastic member, and a metal dome to hold the horizontal elastic member and the balancing bar. The metal dome may include a first end fixedly connected to the bottom cover via a first fixture and a second end to hold the horizontal elastic member and the balancing bar such that the balancing bar is flexibly engaged with the bottom cover. The balancing bar along with the horizontal elastic member and the metal dome may control the flexure of the touchpad when the touchpad is pressed.

Examples described herein may provide a structural arrangement that provides uniformity and stabilization to the touchpad, thereby averting damage/deformation caused to the touchpad due to excess force applied by the user during operation of the touchpad. Further, examples described herein may improve the structural strength and enhance reliability/durability of the touchpad assembly. Furthermore, the structural arrangement may enable fine tuning of the location at which the user provides click input on touchpad and may provide a haptic feedback (i.e., tactile sensation) to the user in response to the click input.

Figure 1A:
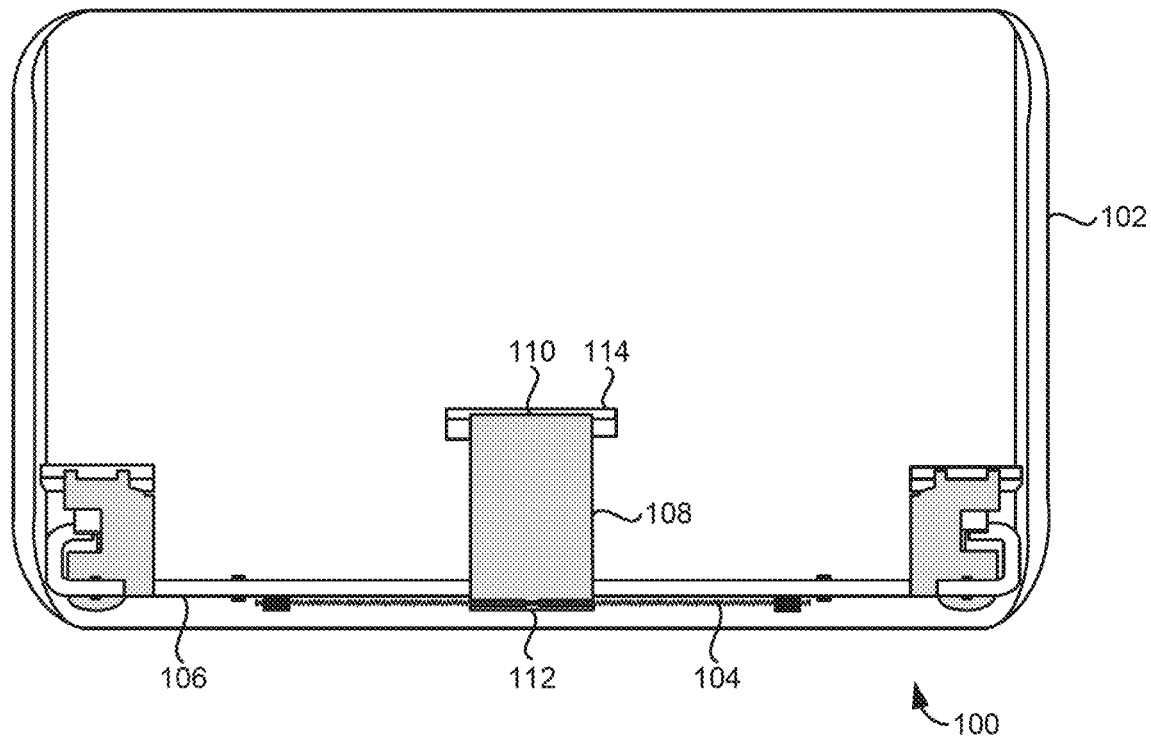
FIG. 1A is a top view of an example touchpad assembly depicting a structural arrangement to control a flexure of a touchpad.

Turning now to the figures, FIG. 1A is a top view of an example touchpad assembly 100, depicting a structural arrangement to control a flexure of a touchpad. Touchpad assembly 100 may be a component of an electronic device such as a notebook computer, a tablet computer, a convertible device, a detachable device, and the like. In other examples, touchpad assembly 100 may be integrated into other devices or may be a standalone peripheral. Touchpad assembly 100 may be used to provide cursor inputs and/or click inputs on graphical user interfaces (GUIs) of the electronic device.

As shown in FIG. 1A, touchpad assembly 100 may include a bottom cover 102, a horizontal elastic member 104, a balancing bar 106, and a metal dome 108. Horizontal elastic member 104 may be flexibly positioned on bottom cover 102. Example horizontal elastic member 104 may be a horizontal spring. Balancing bar 106 may be disposed on bottom cover 102 and substantially parallel to horizontal elastic member 104. Example balancing bar 106 may be made of a metallic material. In one example, balancing bar 106 may be flexible to an inclined orientation when the touchpad is pressed at the time of the click input.

Metal dome 108 may include a first end 110 fixedly connected to bottom cover 102 via a first fixture 114 and a second end 112 to hold horizontal elastic member 104 and balancing bar 106 such that balancing bar 106 is flexibly engaged with bottom cover 102. In one example, balancing bar 106, metal dome 108, and horizontal elastic member 104 may control the flexure of the touchpad when the touchpad is pressed. For example, metal dome 108 along with horizontal elastic member 104 may permit the inclined movement of balancing bar 106 when the touchpad is pressed. Further, metal dome 108 along with horizontal elastic member 104 may resiliently return balancing bar 106 along with the touchpad to an original position when the touchpad is released. An example structural arrangement of horizontal elastic member 104, balancing bar 106 and metal dome 108 is described in FIGS. 1B and 1C.

Figure 1B:
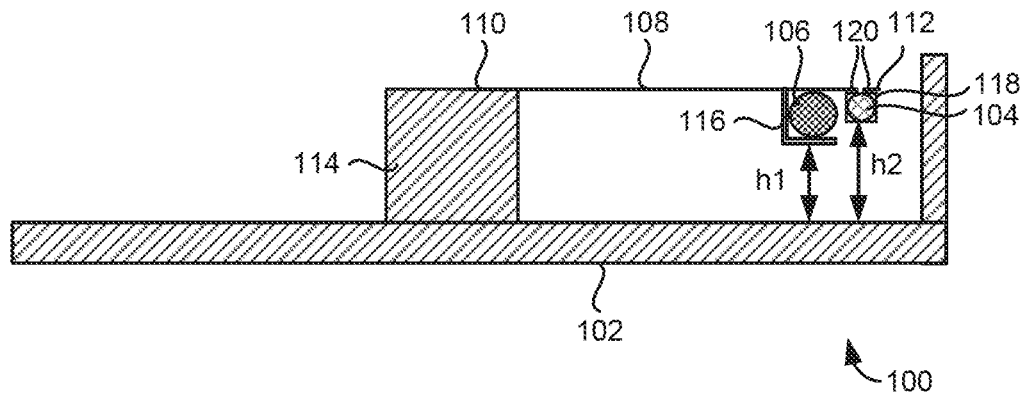
FIG. 1B is a side view of a portion of the example touchpad assembly of FIG. 1A, depicting a metal dome to hold a balancing bar and a horizontal spring.

FIG. 1B is a side view of a portion of example touchpad assembly 100, depicting metal dome 108 to hold balancing bar 106 and horizontal elastic member 104. As shown in FIG. 1B, first end 110 of metal dome 108 may be connected to first fixture 114. Further, second end 112 of metal dome 108 may include a clamping structure 116 to flexibly hold a center portion of balancing bar 106 at a first level (h1) above a surface of bottom cover 102. In one example, clamping structure 116 may be a curved or concave structure that is formed extending from a bottom side of bottom cover 102. Example clamping structure may be L-shaped, J-shaped, U-shaped, and the like. In other examples, metal dome 108 may be a single-piece structure having a curved portion at second end 112 to hold balancing bar 106.

Further, second end 112 of metal dome 108 may include a recess portion 118 to accommodate horizontal elastic member 104 at a second level (h2) above the surface of bottom cover 102, where h1≤h2. In one example, recess portion 118 may be formed along a length of metal dome 108 at a top side. Furthermore, metal dome 108 may include at least one clamping tip 120 to hold horizontal elastic member 104 within recess portion 118. Touchpad assembly 100 may include coupling elements 134 (e.g., as illustrated in FIG. 1C) in bottom cover 102 to fixedly hold horizontal elastic member 104 at the second level above the surface of bottom cover 102, wherein horizontal elastic member 104 can be held in a stretched state as shown in FIG. 1C.

Figure 1C:
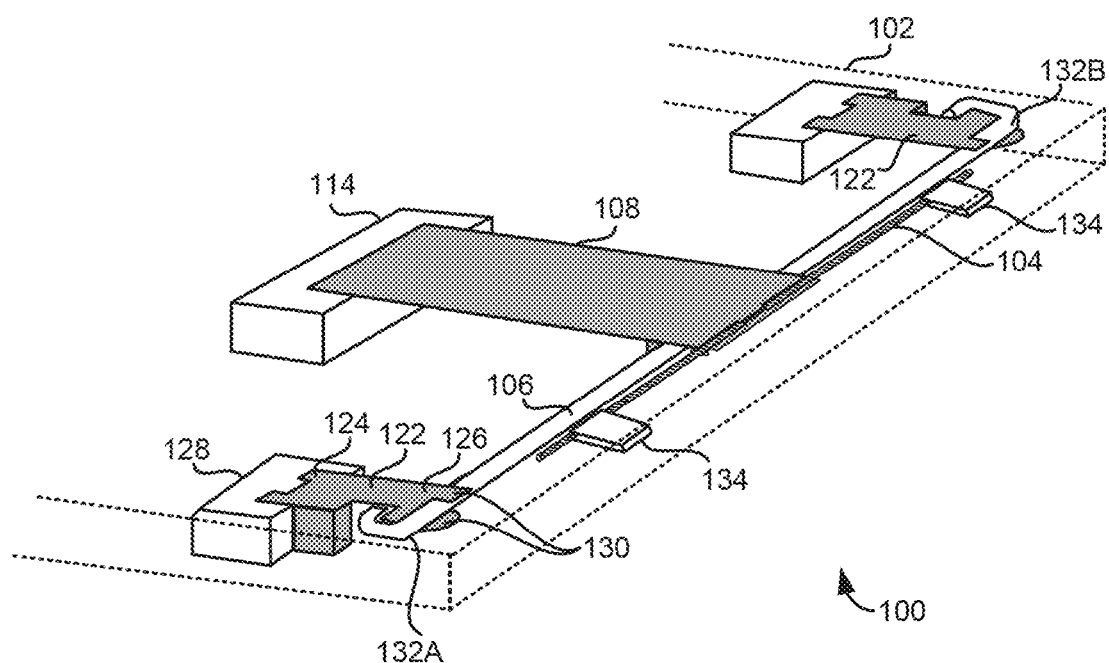
FIG. 1C is a perspective view of the example touchpad assembly, as shown in FIG. 1A, depicting additional components.

FIG. 1C is a perspective view of example touchpad assembly 100, depicting additional components. As shown in FIG. 1C, touchpad assembly 100 may include a pair of rubber pads 122 disposed on either side of metal dome 108, for instance, towards the front corners of bottom cover 102. Rubber pads 122 may flexibly couple opposite ends 132A and 132B of balancing bar 106 to bottom cover 102. In one example, each rubber pad 122 may include a first end 124 fixedly connected to bottom cover 102 via a second fixture 128. Example first fixture 114 and second fixture 128 may be formed extending from the surface of bottom cover 102. In one example, metal dome 108 and rubber pads 122 may be coupled to first fixture 114 and second fixture 128, respectively, for instance using adhesives, mechanical fasteners, or other fastening mechanisms.

Further, each rubber pad 122 may include a second end 126 having at least one bracket 130 to flexibly hold a corresponding end (i.e., 132A and 132B) of balancing bar 106 at the first level h1 above the surface of bottom cover 102. When balancing bar 106 swings at the time of a click input, rubber pads 122 may provide elasticity to corresponding ends 132A and 132B of balancing bar 106 such that ends 132A and 132B of balancing bar 106 may not contact bottom cover 102 prior to actuation of a click input. Clamping structure 116 and brackets 130 may permit balancing bar 106 to rotate when the touchpad is pressed. Thus, rubber pads 122 along with metal dome 108 and horizontal elastic member 104 may provide stabilization for balancing bar 106 at the time of click input.

Figure 2:
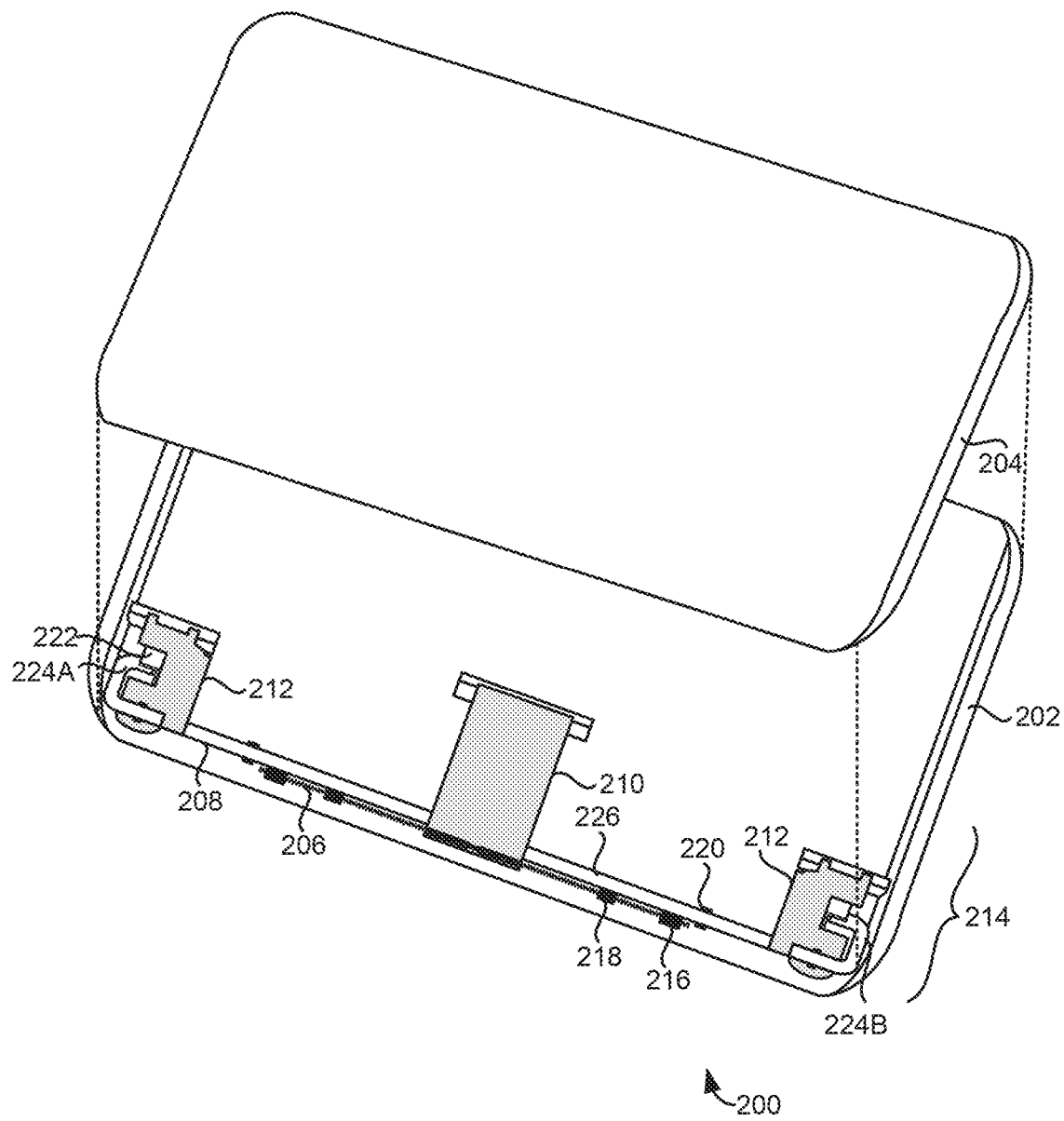
FIG. 2 is a top view of an example touchpad assembly for an electronic device.

FIG. 2 is a perspective view of an example touchpad assembly 200 for an electronic device. For example, similarly named elements of FIG. 2 may be similar in structure and/or function to elements described with respect to FIGS. 1A-C. As shown in FIG. 2, touchpad assembly 200 may include a bottom cover 202 and a touchpad 204 disposed on bottom cover 202. Example touchpad 204 may include a touch sensing circuit board and a touch panel electrically connected to the touch sensing circuit board. Touchpad 204 may have a tactile sensing surface, such as a capacitive sensing surface.

Further, touchpad assembly 200 may include a horizontal spring 206, a balancing bar 208, a metal dome 210, and a pair of rubber pads 212 that are disposed at a front edge 214 of bottom cover 202. Balancing bar 208, horizontal spring 206, metal dome 210, and rubber pads 212 may be disposed between touchpad 204 and bottom cover 202.

Balancing bar 208 may be disposed on bottom cover 202 to control a flexure of touchpad 204. In one example, balancing bar 208 may include a first arm portion 224A, a second arm portion 224B, and a shaft portion 226 connecting first arm portion 224A and second arm portion 224B. Example first arm portion 224A and second arm portion 224B may be U-shaped structures, J-shaped structures, or the like.

Horizontal spring 206 may be flexibly positioned on bottom cover 202 and substantially parallel to shaft portion 226 of balancing bar 208. In one example, the length of horizontal spring 206 may be less than or equal to the length of shaft portion 226. In one example, touchpad assembly 200 may include coupling elements 216 to fixedly hold ends of horizontal spring 206 relative to bottom cover 202. Example coupling elements 216 may fixedly hold horizontal spring 206 in a stretched state at a second level (e.g., h2) above the surface of bottom cover 202.

Further, touchpad assembly 200 may include first supporting elements 218 disposed between coupling elements 216. First supporting elements 218 may enhance the tension/elasticity of horizontal spring 206, thereby supporting vertical movement of horizontal spring 206 relative to balancing bar 208. Example coupling elements 216 and first supporting elements 218 may be formed extending from either a sidewall or a bottom surface of bottom cover 202.

Metal dome 210 may flexibly hold a center portion of shaft portion 226 and horizontal spring 206 above a surface of the bottom cover 202. Rubber pads 212 may flexibly connected to opposite ends of shaft portion 226 such that the balancing bar 208 can be held above the surface of the bottom cover 202. Touchpad assembly 200 may include second supporting elements 220 disposed between metal dome 210 and rubber pads 212 to support vertical movement of balancing bar 208. Additional fixtures 222 may be disposed on bottom cover 202 adjacent to arm portions 224A and 224B of balancing bar 208. Metal dome 210 and rubber pads 212 may permit shaft portion 226 to rotate when touchpad 204 is pressed and additional fixtures 222 may permit first arm portion 224A and second arm portion 224B to rotate along with shaft portion 226 when touchpad 204 is pressed.

When touchpad 204 is pressed, metal dome 210, horizontal spring 206, and rubber pads 212 may provide stabilization for balancing bar 208. Consider a user presses a bottom corner of touchpad 204 to provide a click input. In this case, balancing bar 208 may be moved to an inclined orientation relative to a force exerted on touchpad 204. Metal dome 210, horizontal spring 206, and rubber pads 212 may stabilize inclination movement of balancing bar 208 with respect to touchpad 204. In one example, metal dome 210 and horizontal spring 206 may control the movement of shaft portion 226 of balancing bar 208. Further, rubber pads 212 may provide elasticity to corresponding ends of balancing bar 208. Thus, balancing bar 208, horizontal spring 206, metal dome 210, and rubber pads 212 may combinedly control a flexure of touchpad 204 at the time of the click input. Further, when the user releases the bottom corner of touchpad 204 after the click input, metal dome 210 along with horizontal spring 206 and rubber pads 212 may resiliently return balancing bar 208 from the inclined orientation to an original orientation.

For example, when a user presses a first location (e.g., corresponding to first arm portion 224A) of touchpad 204, a second location (e.g., corresponding to second arm portion 224B) of touchpad 204 is pulled. In this case, when the first location is pressed, the end of shaft portion 226 may exert a torque on second arm portion 224B, causing second arm portion 224B to rotate about the axis defined by first and second arm portions 224A and 224B, pulling the second location in the same direction as the first location. In some examples, this may prevent the first location from twisting with respect to the second location.

Figure 3:
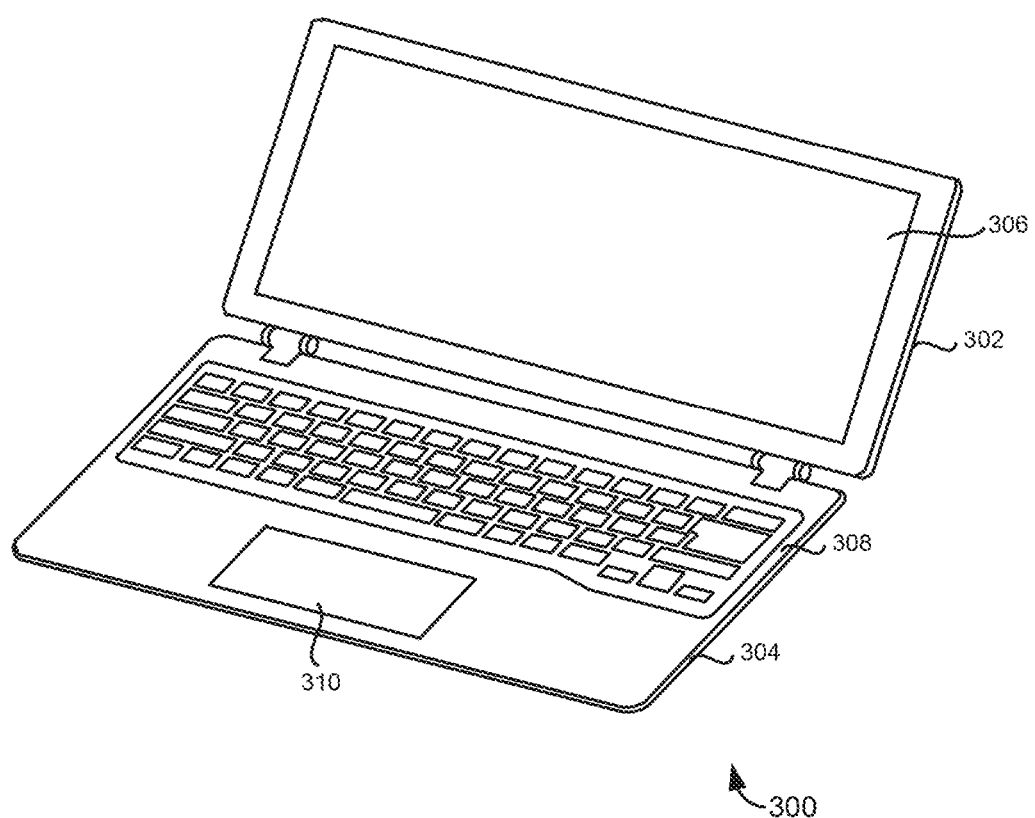
FIG. 3 is a perspective view of an example electronic device including the touchpad assembly.

FIG. 3 is a perspective view of an example electronic device 300 including a touchpad assembly 310, such as the touchpad assembly 100 and 200 shown in FIGS. 1 and 2. For example, similarly named elements of FIG. 3 may be similar in structure and/or function to elements described with respect to FIGS. 1A-C and 2. As shown in FIG. 3, electronic device 300 may include an upper housing 302 and a lower housing 304. In one example, upper housing 302 may be rotatably, detachably or twistably connected to lower housing 304. Example electronic device 300 may include a notebook computer, tablet computer, detachable computer, convertible computer, or any other device that receives click inputs via a touchpad. Example convertible computer or detachable computer may refer to a device that can be "converted" from a laptop mode to a tablet mode.

Example upper housing 302 may include a display 306 that can be, for example, a liquid crystal display (LCD), a light emitting diode (LED) display, or other type of electronic visual display device. Example lower housing 304 may include keyboard assembly 308 and touchpad assembly 310. In one example, touchpad assembly 310 may be located in front of keyboard assembly 308. For example, touchpad assembly 310 may be located in a palm rest region of electronic device 300.

Example touchpad assembly 310 may include a bottom cover, a balancing bar, a horizontal spring, a metal dome and a touchpad disposed on the bottom cover and underneath a region at which a click input is provided on touchpad. In one example, balancing bar, horizontal spring, metal dome, and rubber pads may combinedly provide a balancing mechanism to control a flexure of touchpad when touchpad is pressed at the time of the click input. Structural arrangement of the balancing mechanism is explained in detail in FIGS. 1 and 2.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A touchpad assembly comprising: a bottom cover; a horizontal elastic member flexibly positioned en at a first level above the bottom cover; a balancing bar disposed at a second level above the bottom cover and substantially parallel to the horizontal elastic member; and a metal dome comprising: a first end fixedly connected to the bottom cover via a first fixture; and a second end to hold a center of the horizontal elastic member and the balancing bar such that the balancing bar is flexibly engaged with the bottom cover and the horizontal elastic member extends from the metal dome toward opposite edges of the bottom cover substantially along the balancing bar and a front edge of the bottom cover, wherein the balancing bar, the metal dome, and the horizontal elastic member are to control a flexure of a touchpad when the touchpad is pressed.

2. The touchpad assembly of claim 1, wherein the horizontal elastic member is a horizontal spring.

3. The touchpad assembly of claim 1, wherein the second end of the metal dome comprises a clamping structure to flexibly hold a center portion of the balancing bar at the first level above a surface of the bottom cover.

4. The touchpad assembly of claim 1, wherein the metal dome comprises:
   a recess portion formed along a length of the metal dome, at the second end, to accommodate the horizontal elastic member; and
   at least one clamping tip to hold the horizontal elastic member within the recess portion.

5. The touchpad assembly of claim 1, comprising coupling elements in the bottom cover to fixedly hold the horizontal elastic member at the second level above a surface of the bottom cover, and wherein the horizontal elastic member is held in a stretched state.

6. The touchpad assembly of claim 1, comprising a pair of rubber pads to flexibly couple opposite ends of the balancing bar to the bottom cover, wherein each rubber pad comprises:
   a first end fixedly connected to the bottom cover via a second fixture; and
   a second end having at least one bracket to flexibly hold a corresponding end of the balancing bar at a first level above a surface of the bottom cover.

7. The touchpad assembly of claim 6, wherein the balancing bar, the horizontal elastic member, the metal dome, and the rubber pads are disposed at a region in proximity to a front edge of the bottom cover.

8. A touchpad assembly comprising: a bottom cover and a touchpad disposed on the bottom cover; a balancing bar disposed at a first level above the bottom cover to control a flexure of the touchpad; a horizontal spring flexibly positioned at a second level above the bottom cover and substantially parallel to the balancing bar; a metal dome to flexibly hold a center of the balancing bar and horizontal spring above a surface of the bottom cover, wherein the horizontal spring extends from the metal dome toward opposite edges of the bottom cover substantially along the balancing bar and a front edge of the bottom cover; and a pair of rubber pads to flexibly hold opposite ends of the balancing bar above the surface of the bottom cover, wherein the metal dome, the horizontal spring, and the rubber pads are to provide stabilization for the balancing bar.

9. The touchpad assembly of claim 8, wherein the metal dome comprises:
   a first end fixedly connected to the bottom cover via a first fixture; and a second end having a clamping structure at a bottom side to hold the balancing bar and a recess portion at a top side to hold the horizontal spring.

10. The touchpad assembly of claim 8, wherein each rubber pad comprises:
   a first end fixedly connected to the bottom cover via a second fixture; and
   a second end having at least one bracket connected to a corresponding end of the balancing bar to flexibly hold the balancing bar at the first level above the surface of the bottom cover.

11. The touchpad assembly of claim 8, comprising coupling elements in the bottom cover to fixedly hold the horizontal spring in a stretched state at the second level above the surface of the bottom cover.

12. The touchpad assembly of claim 11, comprising:
   first supporting elements disposed between the coupling elements to support vertical movement of the horizontal spring relative to the balancing bar; and
   second supporting elements disposed between the metal dome and the rubber pads to support vertical movement of the balancing bar.

13. An electronic device comprising: a second housing comprising a keyboard and touchpad assembly, wherein the touchpad assembly comprising: a bottom cover; a balancing bar disposed in the bottom cover; a horizontal spring flexibly positioned on the bottom cover and substantially parallel to the balancing bar; a metal dome comprising: a first end fixedly connected to the bottom cover via a fixture; and a second end to flexibly hold a center of the horizontal spring at a first level above the bottom cover and the balancing bar at a second level above the bottom cover, wherein the horizontal spring extends from the metal dome toward opposite edges of the bottom cover substantially along the balancing bar and a front edge of the bottom cover; and a touchpad disposed on the bottom cover.

14. The electronic device of claim 13, wherein the balancing bar comprises a first arm portion, a second arm portion, and a shaft portion connecting the first arm portion and the second arm portion, wherein the first arm portion and the second arm portion are U-shaped structures, and wherein the metal dome is to flexibly hold a center of the shaft portion.

15. The electronic device of claim 14, wherein the touchpad assembly comprising a pair of rubber pads to hold corresponding ends of the shaft portion.

* * * * *